(12) United States Patent
Moscovitch

(10) Patent No.: US 7,061,754 B2
(45) Date of Patent: Jun. 13, 2006

(54) LCD SYSTEM HAVING INTEGRATED CPU

(76) Inventor: Gerald Moscovitch, 59 Cowar Avenue, Toronto, Ontario (CA) M6K 2N1

( * ) Notice: Subject to any disclaimer, the term of this patent is extended or adjusted under 35 U.S.C. 154(b) by 0 days.

(21) Appl. No.: 10/170,826

(22) Filed: Jun. 13, 2002

(65) Prior Publication Data

US 2003/0231460 A1    Dec. 18, 2003

(51) Int. Cl.
*G06F 1/16* (2006.01)

(52) U.S. Cl. .................. 361/683; 361/681; 248/917

(58) Field of Classification Search ........ 361/681–683; 248/917–924; G06F 1/16
See application file for complete search history.

(56) References Cited

U.S. PATENT DOCUMENTS

| 5,680,820 | A | | 10/1997 | Randolph | |
|---|---|---|---|---|---|
| 5,687,939 | A | * | 11/1997 | Moscovitch | 248/122.1 |
| 5,904,328 | A | * | 5/1999 | Leveridge et al. | 248/124.1 |
| 6,151,401 | A | * | 11/2000 | Annaratone | 361/683 |
| RE36,978 | E | * | 12/2000 | Moscovitch | 248/222.1 |
| 6,188,569 | B1 | * | 2/2001 | Minemoto et al. | 361/683 |
| 6,222,507 | B1 | * | 4/2001 | Gouko | 361/681 |
| 6,275,375 | B1 | * | 8/2001 | Nam | 361/682 |
| D448,023 | S | * | 9/2001 | Kim | D14/337 |
| D448,370 | S | * | 9/2001 | Kim | D14/337 |
| 6,343,006 | B1 | * | 1/2002 | Moscovitch et al. | 361/681 |
| 6,366,453 | B1 | * | 4/2002 | Wang et al. | 361/681 |
| 6,532,146 | B1 | * | 3/2003 | Duquette | 361/681 |
| 6,643,124 | B1 | * | 11/2003 | Wilk | 361/681 |

FOREIGN PATENT DOCUMENTS

| EP | 1102456 | | 5/2001 |
|---|---|---|---|
| EP | 11488409 | A2 | 10/2001 |
| WO | 9939328 | | 8/1999 |
| WO | WO 00/50979 | * | 2/2000 |
| WO | 0039493 | | 7/2000 |
| WO | WO 01/35196 | A1 * | 11/2000 |

* cited by examiner

*Primary Examiner*—Lisa Lea-Edmonds

(57) ABSTRACT

An LCD support system includes structure adaptable to selectively accommodate a central processing unit, a plurality of media drivers and a plurality of viewing screens so that no external electrical cabling is needed to couple the various subcomponents to one another. The plurality of viewing screens are selectively positioned along vertical and/or horizontal arms extending from the structure. Slidable brackets having viewing screens coupled thereto are movable along the arms of the structure to customize the multiple viewing screen arrangement according to a desired spacing and/or setup. A central processing unit may be readily detached from a first computer system having a first viewing screen configuration and attached to a second computer system having an alternative viewing screen configuration. The present invention provides a very compact, uncluttered means for supporting one or more LCD screens.

11 Claims, 14 Drawing Sheets

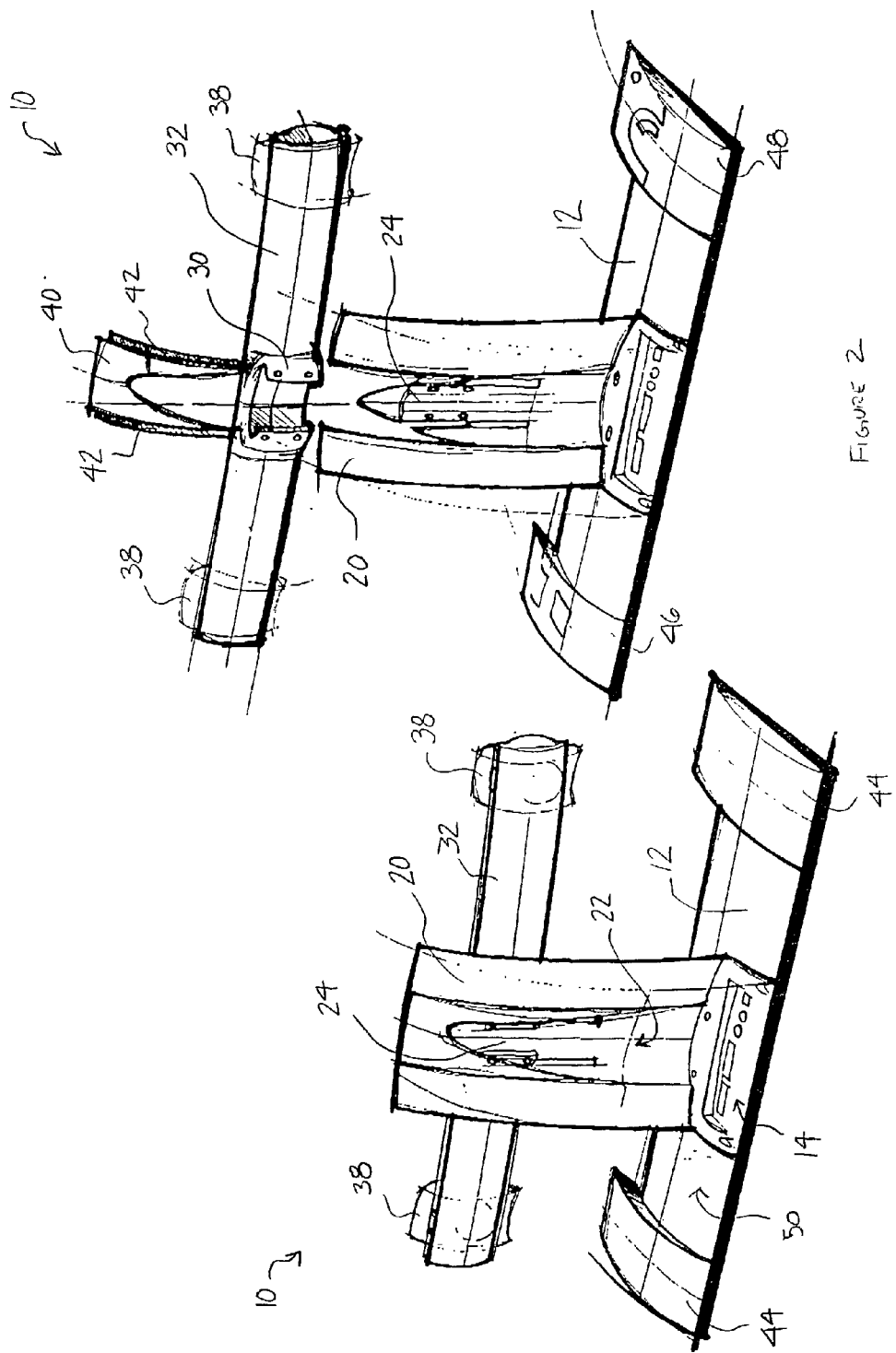

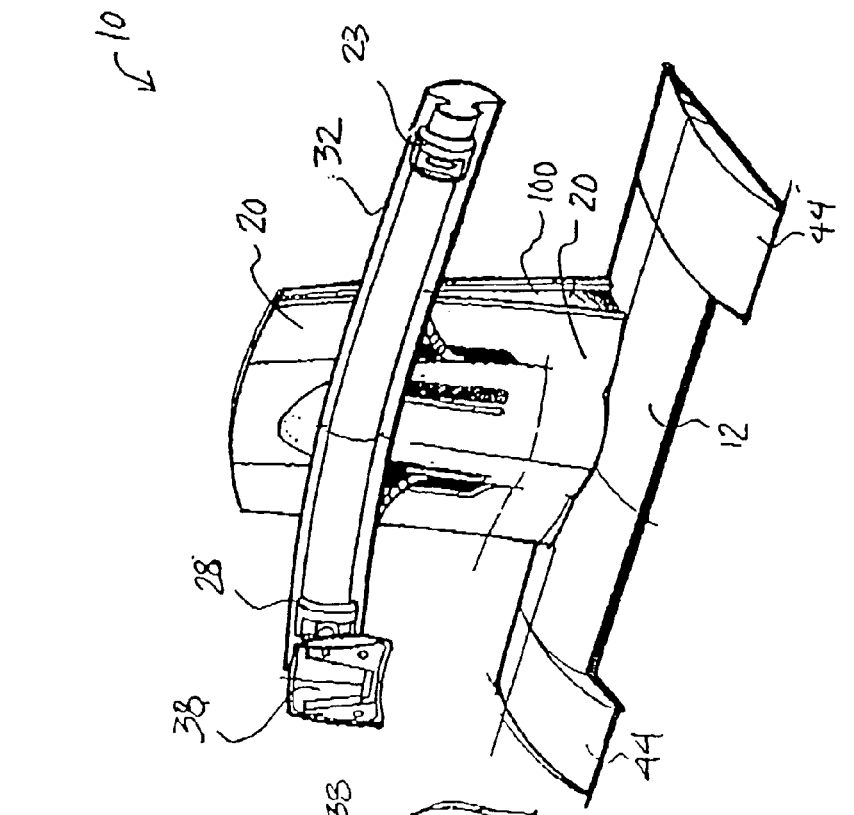
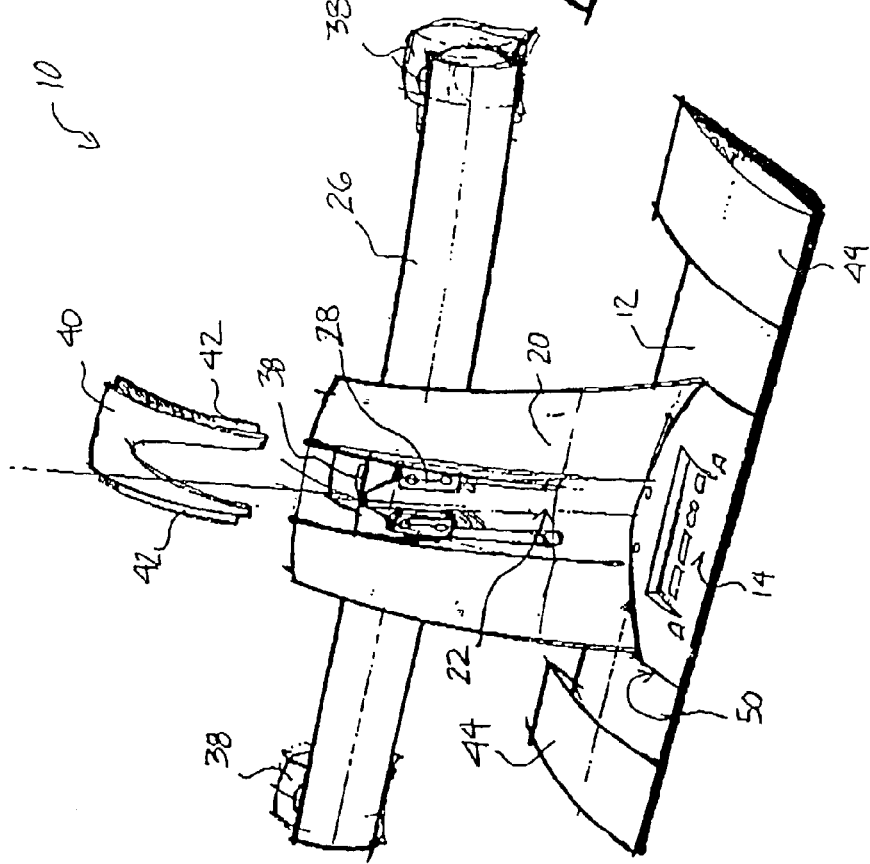

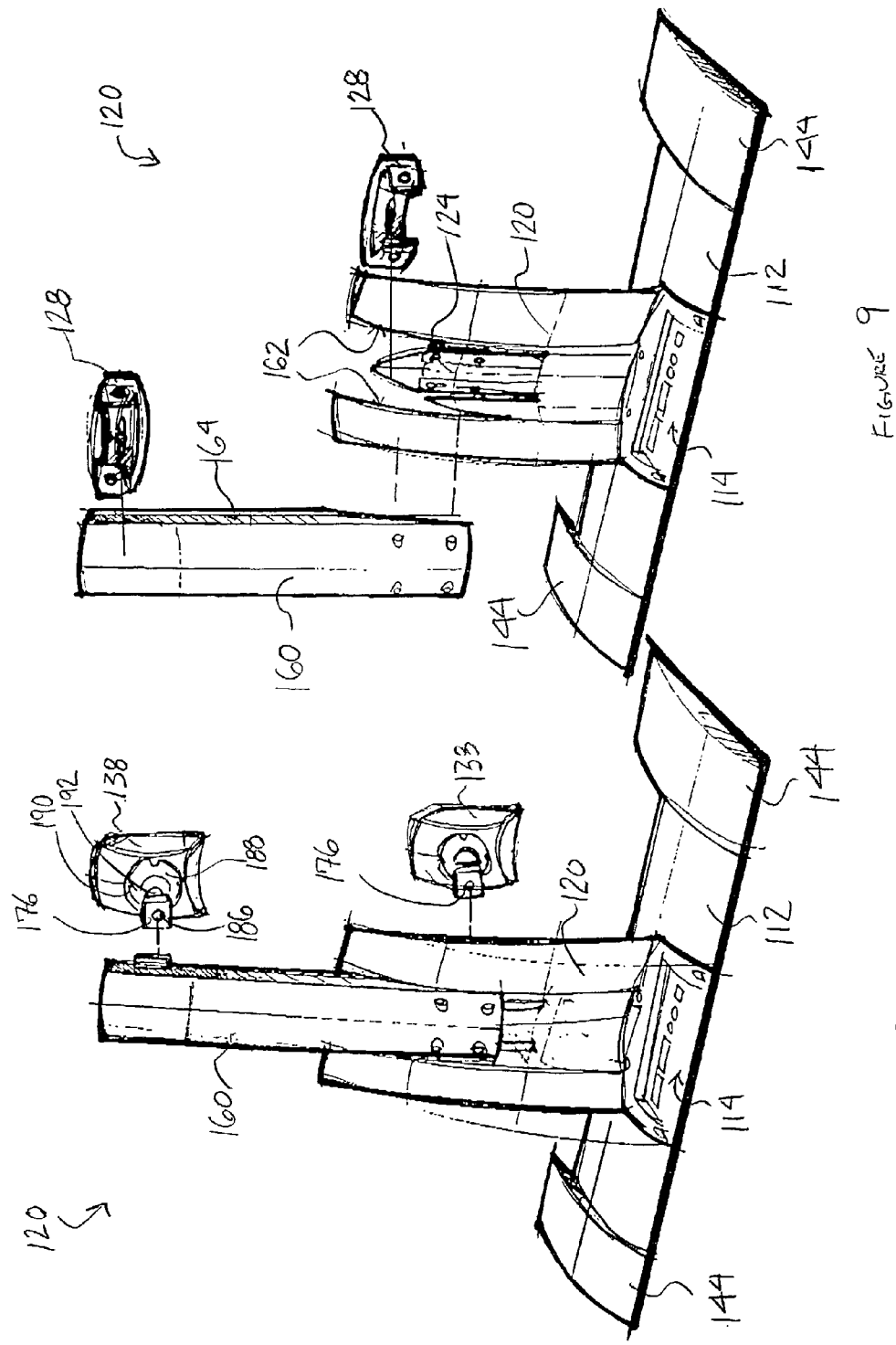

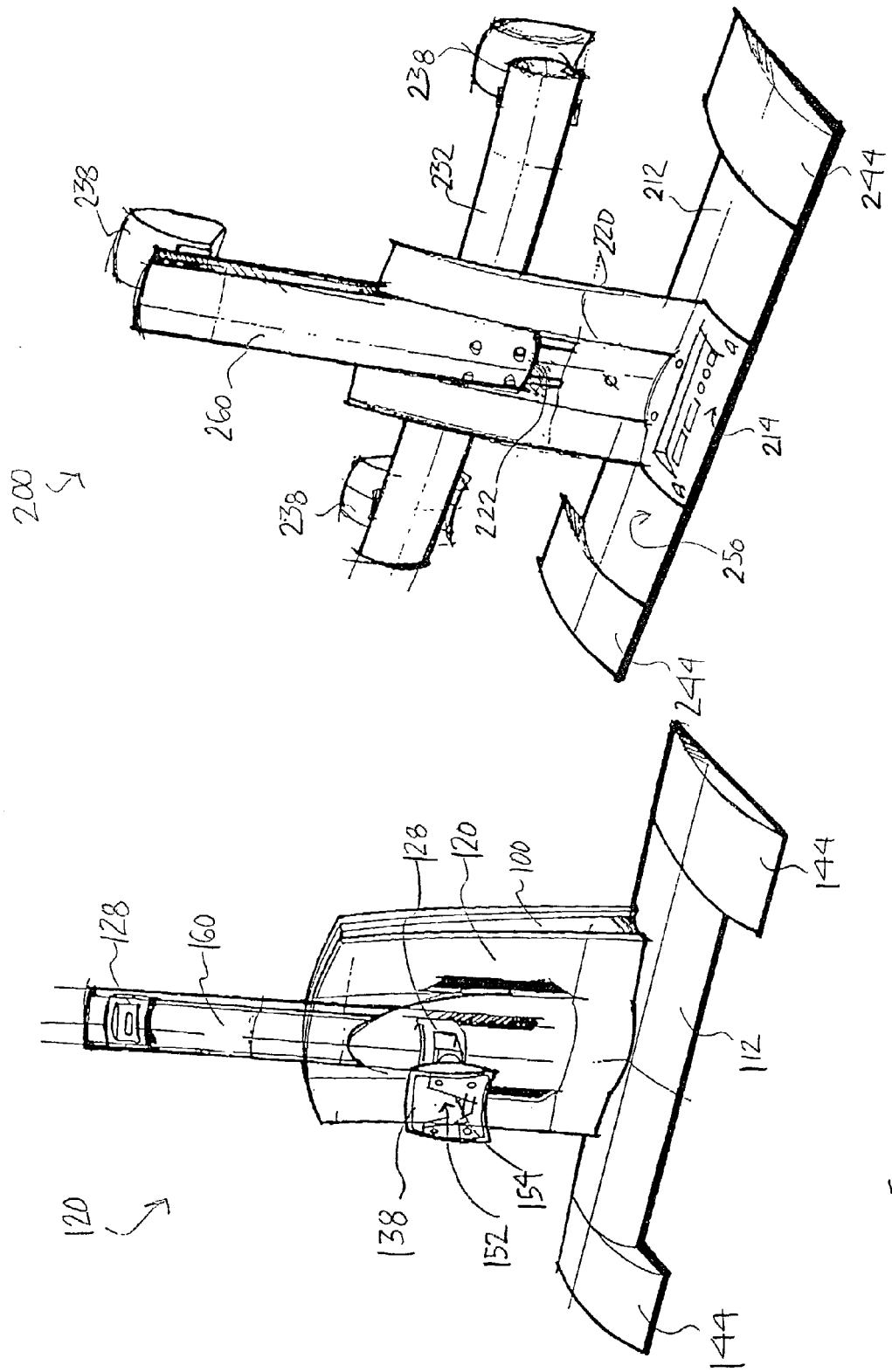

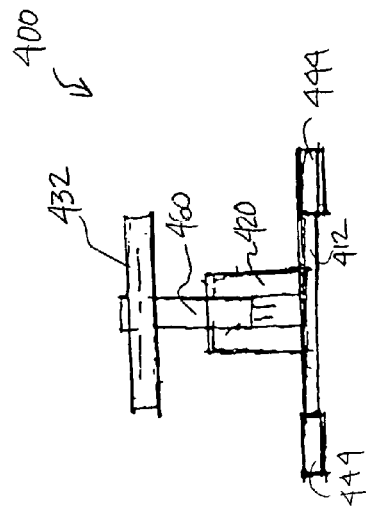
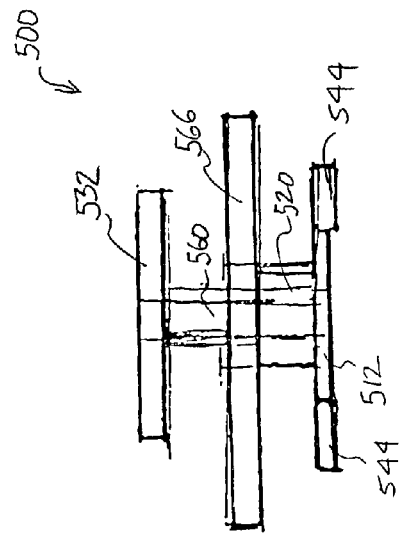
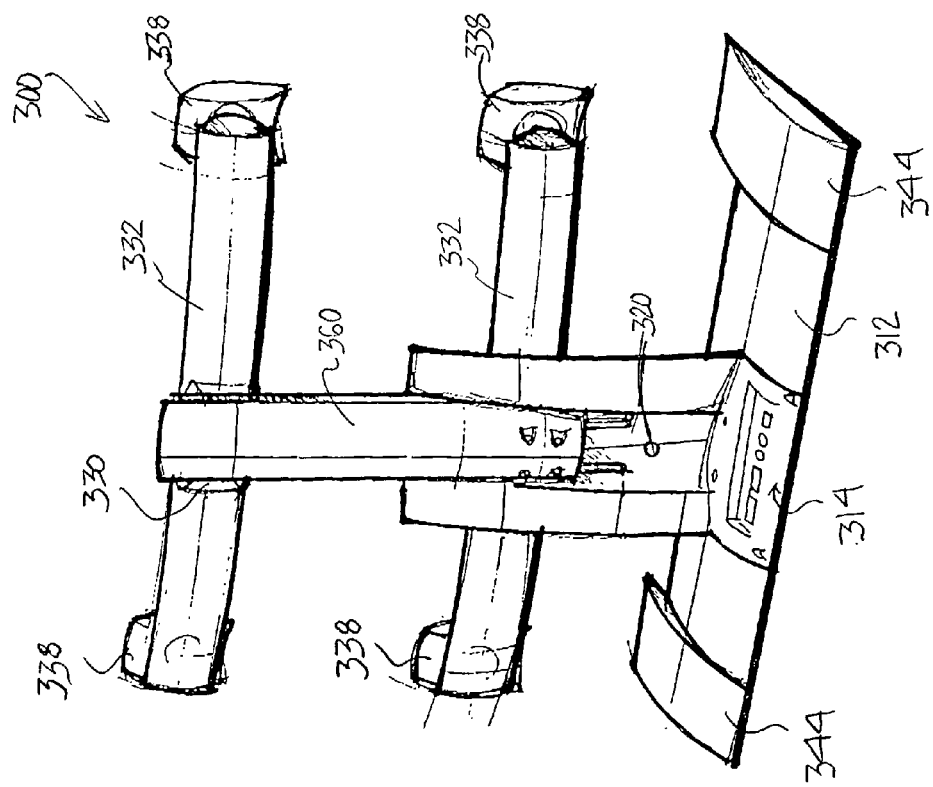

LCD SYSTEM HAVING INTEGRATED CPU

FIELD OF THE INVENTION

The present invention generally pertains to computer systems, and more particularly to a computer system wherein a central processing unit, a plurality of media drivers, various electrical and power cables and other hardware components are all housed within structure used to support a plurality of viewing screens.

BACKGROUND OF THE INVENTION

With present day computer systems, the configuration of the system is often limited and does not provide for much flexibility in terms of being able to mix and match peripherals. This is especially so for the display portion of the system. With systems employing a liquid crystal display (LCD) screen, there is often no means for easily attaching additional LCD screens, or for reconfiguring two or more existing screens, or for allowing easy and quick removal and/or replacement of one of more LCD screens of different sizes.

Another disadvantage with present day computer systems is the large number of electrical cables that must be used to couple the CPU with the peripherals. This is especially so when two or more LCD screens are used. Each LCD screen requires its own data cable and power cable, so, for example, a three LCD screen system would require, for example, six cables to be coupled to the LCD screens. As will be appreciated, these cables significantly clutter the user's work area. When power and data cables from additional peripherals such as DVDs, ZIP drives, etc, are added, the collection of cables can significantly interfere with the work space of the user.

In view of these drawbacks, it would be highly desirable to provide a modular computer system which allows one or more LCD screens to be used, according to the user's needs, and which permits easy adding or removal of LCD screens without significant and time consuming disassembly steps being required.

Just as importantly, it would be desirable to provide a computer system which includes a support structure capable of housing the power and data cables needed for coupling the LCD screens and peripherals making up the system to the CPU. In this manner, the large number of data and power cables could be maintained out of the user's sight and out of the user's immediate work area.

SUMMARY OF THE INVENTION

In one preferred form the present invention provides a display screen support system which functions to support one or more video display screens, as well as to house a computer system and related electrical and power cabling. In one preferred form the display screens comprise liquid crystal display (LCD) screens. The screen support system includes a support, which in one preferred form comprise a base, having a central processing unit interface portion for selectively interconnecting with a central processing unit housed within the base. A column extends upwardly from the base. A laterally extending arm includes an engagement portion for selectively coupling to a complimentary engagement portion disposed in the column. At least one bracket is coupled to the arm and is operable to slidably traverse the arm. The bracket is configured to couple with an associated LCD screen.

The present invention thus makes use of the structure that would ordinarily just be used to support the LCD screen(s) to also house the central processing unit (CPU), one or more power supplies, and various cables typically used to couple the LCD screen(s) with the CPU and also to provide power to the LCSs and other electronic components of the system. In this manner the numerous cables and power supplies that would typically be present on and around a user's work area are all hidden within the LCD support system. This makes for a very organized and aesthetically appealing support structure.

BRIEF DESCRIPTION OF THE DRAWINGS

The present invention will become more fully understood from the detailed description and the accompanying drawings, wherein:

FIG. 1 is a rear perspective view of the computer system according to a first embodiment shown with the dual arm in the installed portion;

FIG. 2 is a rear perspective view of the computer system according to a first embodiment shown with the dual arm and cover detached from the computer system as well as engaged working peripherals;

FIG. 3 is a view of the computer system of FIG. 1 shown with the cover removed for illustration;

FIG. 4 is a front perspective view of the computer system of FIG. 1;

FIG. 8 is a rear perspective view of the computer system according to a second embodiment;

FIG. 9 is a rear perspective view of the computer system of FIG. 8 shown with the vertical arm and slider brackets in an uninstalled position;

FIG. 10 is a front perspective view of the computer system of FIG. 8;

FIG. 11 is a rear perspective view of the computer system according to a third embodiment;

FIG. 12 is a rear perspective view of the computer system according to a fourth embodiment;

FIG. 13 is a rear perspective view of the computer system according to a fifth embodiment;

FIG. 14 is a rear perspective view of the computer system according to a sixth embodiment;

DETAILED DESCRIPTION OF THE PREFERRED EMBODIMENTS

Figure 5:
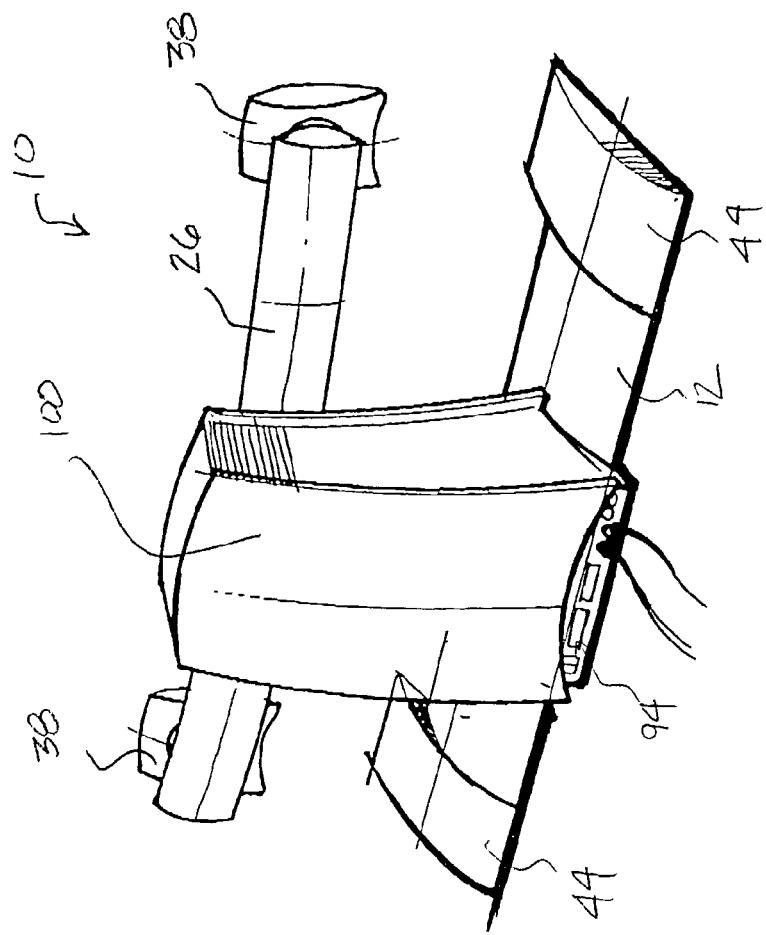
FIG. 5 is a rear perspective view of the computer system of FIG. 1 shown with a central processing unit in an installed position.

The following description of the preferred embodiment(s) is merely exemplary in nature and is in no way intended to limit the invention, its application, or uses.

With initial reference to FIGS. 1 through 4, a support system 10 in accordance with a preferred embodiment of the present invention is shown. In one preferred form the support system 10 forms an LCD support system, and will be referred throughout herein as such. The LCD support system 10 includes a support forming a base 12 having a central processing unit (CPU) interface portion 14 and a generally upright column 20 extending therefrom.

A central portion 22 of the upright column 20 includes a mounting post 24 for slidably accepting a mounting bracket 30 (FIG. 2) extending from a dual arm LCD support 32. The dual arm 32 extends generally parallel to base 12 and perpendicular to column 20 in a mounted position (FIG. 1). Slider brackets 28 (FIGS. 3 and 4), as will be described later in greater detail, include a first portion coupled for slidable engagement with dual arm 32 and a second portion configured for engaging a pivot bracket 38 coupled to an LCD viewing screen. A cover 40 (FIG. 3) includes ears 42 extending from opposite ends thereof for engaging complimentary slots (not specifically shown) incorporated along opposite sides of the central portion 22. The cover 40 encloses the mounting post 24 and bracket 30 connection and creates a more uniform surface across the upper portion of column 20.

With continued reference to FIGS. 1 through 4, base 12 will now be described in greater detail. It will be appreciated that the base 12 could take a variety of shapes and/or configurations. Accordingly, the illustration of the base 12 as a laterally extending component is merely for exemplary purposes. Base 12 includes a generally longitudinal central portion 50 having selectively removable foot portions 44 transversely extending on opposite ends thereof. The foot portions 44 may comprise non operative structural members (FIG. 1) or alternatively comprise working peripherals 46, 48 (FIG. 2) such as a digital video disk (DVD) or a compact disk readable writable (CDRW) module for example. In addition, one or both of the foot portions may include an alternative data storage drive such as a secondary hard drive or ZIP drive. The foot portions 44, 46 and 48 include pins and receivers configured on inboard surfaces thereof (not specifically shown) for mating with complimentary pins and receivers configured on outboard edge surfaces (not specifically shown) of central portion 50 for easy "plug and play" capability. CPU interface portion 14 is centrally configured along central portion 50 and, as with foot portions 46, 48, includes pins and receivers for complimentarily mating with pins and receivers disposed on CPU 100 (FIG. 7) for easy "plug and play" capability. In this regard, CPU 100 (FIG. 4) may be easily detached from LCD support system 10 and relocated to a second computer system. As such, the portability allows the user to move from a first computer system configuration to an alternative computer system configuration which may employ different amounts of viewing screens having alternate orientations as will be discussed in the alternate embodiments herein. Also importantly, the inclusion of the CPU interface portion 14 in the base 12 eliminates the need for electrical cabling to be used exteriorly of the system 10, which would clutter the user's work area. Likewise the attachment of working peripherals 46, 48 eliminates the need for external electrical cabling to connect with the CPU interface 14. This further helps to provide a very uncluttered work area around the LCD support system 10. In one preferred form the base 12 also houses the power supplies needed for powering one or more LCD screens.

As shown in FIGS. 1, 2 and 4, LCD support system 10 includes two slider brackets 38 arranged on opposite ends of dual arm 32. FIG. 3 is shown having a third slider bracket 38 centrally located along extended dual arm 26. Dual arm 26 has a horizontal span sufficient to accommodate three adjacent LCD screens.

Figure 6:
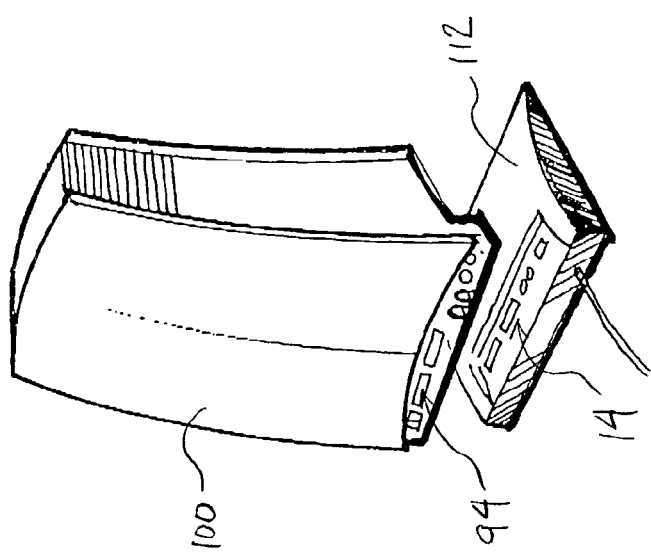
FIG. 6 is a rear perspective view of a central processing unit and a standalone base shown in an uninstalled position.
Figure 7:
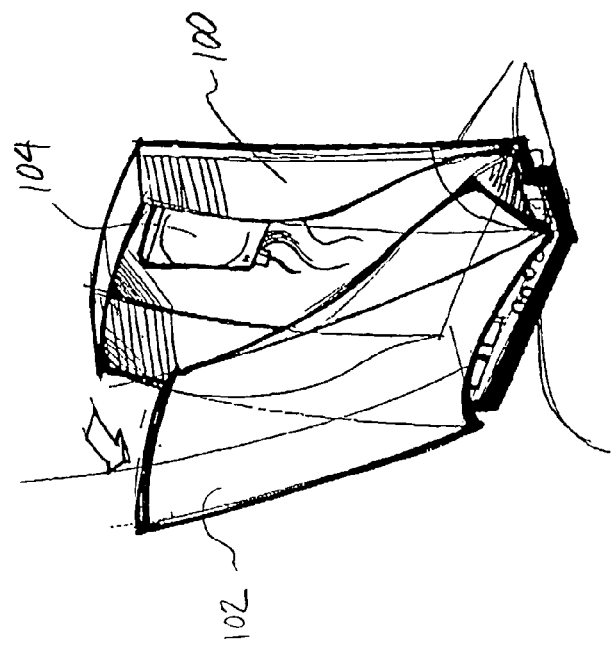
FIG. 7 is a perspective view of the central processing unit installed to the standalone base shown with the door partially opened.

Referencing now FIG. 5 the LCD support system 10 according to the first embodiment is shown with CPU 100 in an installed or docked position. CPU 100 includes vertically oriented connection ports 94 for suitably interfacing with an external pointing device, keyboard and the like. FIG. 6 illustrates an alternative configuration wherein a standalone base unit 112 is provided. The standalone base unit 112 may be used when viewing multiple screens is not required. While not specifically shown, a dual connection port arrangement may also be employed in a side-by-side relationship such that two CPU units 100 may be concurrently docked. Such a setup would provide further memory or processing capability when additional computing resources are desired. In each scenario, the pins and receivers incorporated on the CPU interface portion 14 are configured to mate with complimentary pins and receivers (not specifically shown) disposed on a bottom face of the CPU. As shown in FIG. 7, CPU 100 includes a hingedly attached door 102 for easy access to hard drive 104.

Turning now to FIGS. 8–10, the present invention will be described according to a second embodiment wherein like reference numbers increased by 100 will be used to designate components corresponding to system 10. In this regard, LCD support system 120 includes base 112 shown in cooperative engagement with vertical arm 160. A pair of grooves (not specifically shown) are arranged along opposing inner walls 162 of column 120 to interface with a pair of tongues 164 extending along opposite sides of the arm 160. First and second slider brackets 128 are coupled for slidable engagement with vertical arm 160. First and second pivot brackets 138 selectively couple to first and second slider brackets 128 to provide pivotal movement for a mounted LCD viewing screen. Such a configuration provides for first and second LCD screens to be adjacently mounted in a vertical orientation.

Turning now to FIG. 11, the present invention will be described according to a third embodiment wherein like reference numbers increased by 200 over those used in connection with system 10 will be used to designate like components. As shown, LCD support system 200 includes a vertical arm 260 mounted to the central portion 222 of upright column 220 as previously described. In addition, a slider bracket (not specifically shown) operably interconnects dual LCD support arm 232 to a lower portion of vertical arm 260. This arrangement provides a pyramid configuration in which three LCD screens may be selectively mounted to pivot brackets 238 in a triangular relationship.

Referring now to FIG. 12, LCD support structure 300 will be described according to a fourth embodiment. Like reference numbers increased by a factor of 300 over those used in connection with system 10 will be used to designate like components. Again, both the dual arm 332 and the vertical arm 360 are mounted to column 320. In addition, a second dual arm 332 is slidably mounted on vertical arm 360 with mounting bracket 330.

FIGS. 13 and 14 illustrate the invention according to fifth and sixth embodiments, respectively. As such, the LCD support system 400 of the fifth embodiment includes a vertical arm 460 having a dual arm 432 extending from an upper portion thereof. This configuration allows two LCD screens to be adjacently mounted in a side by side relationship as well as a third LCD screen mounted on a lower portion of the vertical arm 460. While not specifically shown, the LCD screens are preferably mounted to pivot brackets which in turn attach to the slider brackets for slidable movement along dual arm 432.

Referring to FIG. 14, LCD support system 500 of the sixth embodiment, similar to the fifth embodiment, includes a vertical arm 560 having a dual LCD support arm 532 extending from an upper portion. The lower portion of the vertical arm 560, however, includes a horizontal arm 566 mounted thereat. The horizontal arm 566 includes three mounting portions for coupling slider and pivot bracket combinations. This configuration provides two viewing screens adjacently mounted side-by-side on the dual arm 532 as well as three viewing screens adjacently mounted to each other and arranged along horizontal arm 566 under the dual arm 532.

Figure 15:
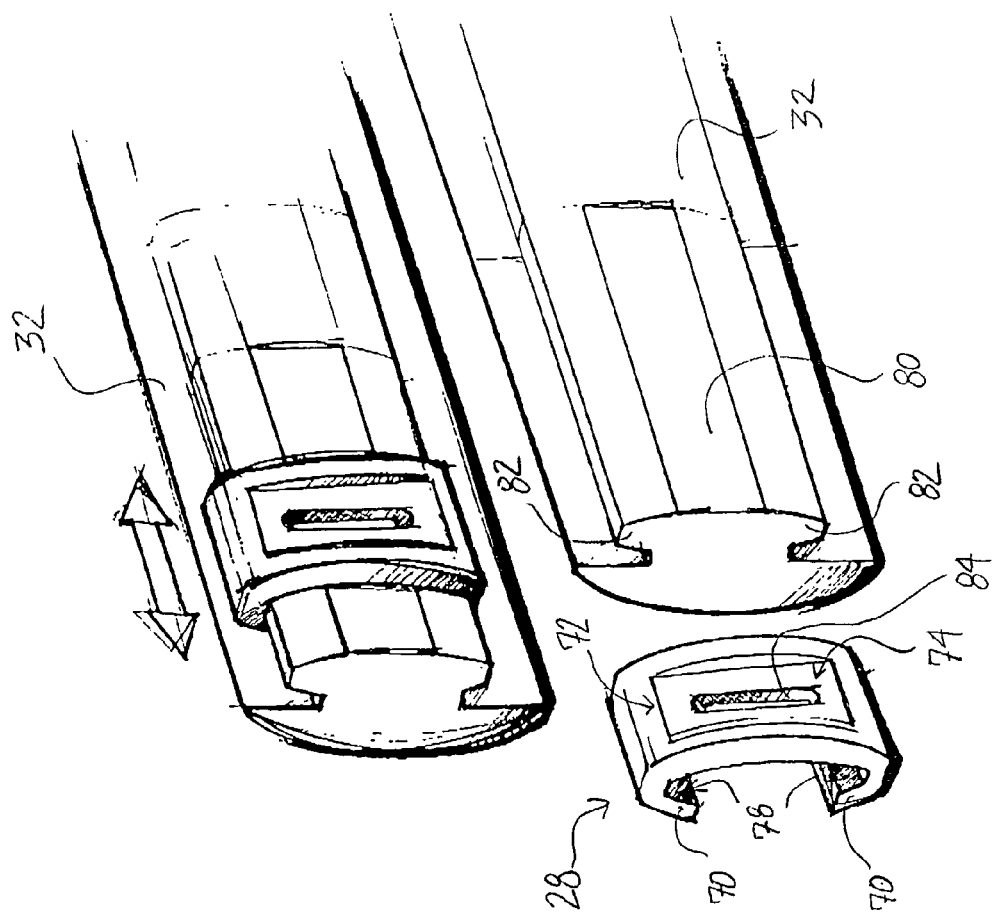
FIG. 15 is a detailed view of a slider bracket and track incorporated on the dual arm.

Referencing now FIGS. 8 and 15, the slider bracket 28 and pivot bracket 38 will be described in greater detail. Pivot bracket 38, will be described with reference to pivot bracket 138 of the second embodiment in FIG. 8. Likewise, while the description of pivot bracket 138 is described in relation to the second embodiment it is appreciated that the description applies to all pivot brackets referred to herein. In addition, while slider bracket 28 is shown operatively associated with dual arm 32 in FIG. 15, it will be apparent that the same slider bracket 28 configuration is employed for vertical arm 60 (FIGS. 8 and 9).

Slider bracket 28 generally comprises a C-shaped member defined by outwardly extending fingers 70. A front face portion 72 includes a recessed rectangular portion 74 for receiving a foot 176 of the pivot bracket 138. The geometry of slider bracket 28 allows for slidable communication along track 80. In this regard, oppositely extending rails 82 are formed along dual arm 32 for settling into arcuate portions 78 of slider bracket 28. A quick connector or similar fastening member (not shown) extends through channel 84 for engaging bore 186 formed in foot 176. Pivot bracket 138 generally comprises a ball 188 received in a socket 190 for pivotal rotation thereabout. Post 192 connects foot 176 to ball 188. A front face 152 (FIG. 10) of pivot bracket 138 includes a groove channel 154 for receiving a mounting portion (not shown) of a viewing screen (not shown). The rail and track configuration explained herein with respect to dual arm 32 is similarly employed for mounting post 24 extending from central portion 22 of column 20. It will be appreciated by those skilled in the art that slider bracket 28 and pivot bracket 138 are merely exemplary and other brackets having different geometries may be similarly employed while reaching similar results.

Figure 16:
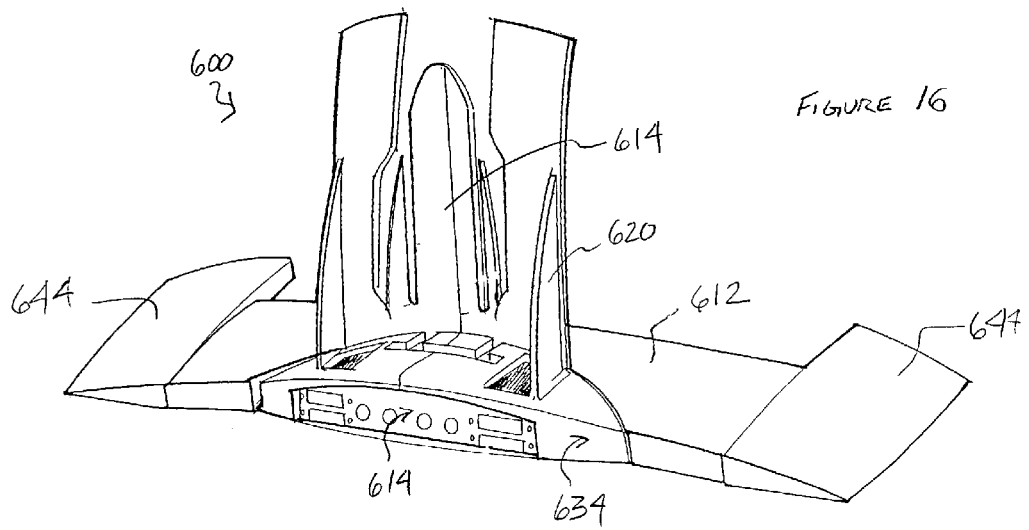
FIG. 16 is a rear perspective view of the computer system according to a seventh embodiment.
Figure 17:
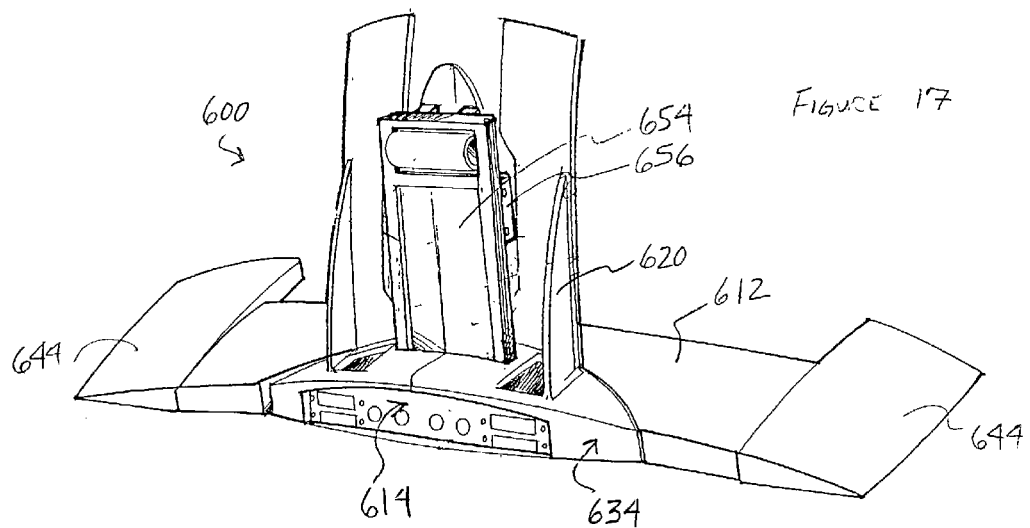
FIG. 17 is a rear perspective view of the computer system of FIG. 16 having the elevator mechanism upwardly extending from a central portion of the base.

Turning now to FIGS. 16 and 17 an LCD support system 600 is provided according to a seventh embodiment wherein like reference numbers increased by 600 over these used in conjunction with system 10 will be used to designate like components. In this regard, an alternative base portion 612 and column 620 are shown having a CPU interface panel 614 operatively disposed on a vertical rear face 634. A CPU unit having vertically oriented pins and receivers (not shown) would be used to mate with interface panel 614. FIG. 17 also shows the computer system having an integrated elevator mechanism 654. The elevator mechanism 654 provides a vertical mechanical assist for adjusting the vertical orientation of a dual or vertical arm such as those discussed herein. Elevator 654 generally includes a static tower having a movable bracket 656. Bracket 656 is actuated by a rack and pinion configuration or other suitable mechanism. LCD support system 600 is also shown with foot portions 644 having an alternate geometry. It will be understood that foot portions 644 include pins and fasteners which mate with complimentary pins and fasteners disposed on base 612. In this regard, foot portions 644 may comprise non-operative structural members or working peripherals as previously described. Although elevator mechanism 654 is shown operatively associated with the seventh embodiment, it will be understood that elevator mechanism 654 may similarly be employed with the other embodiments disclosed herein.

Figure 18:
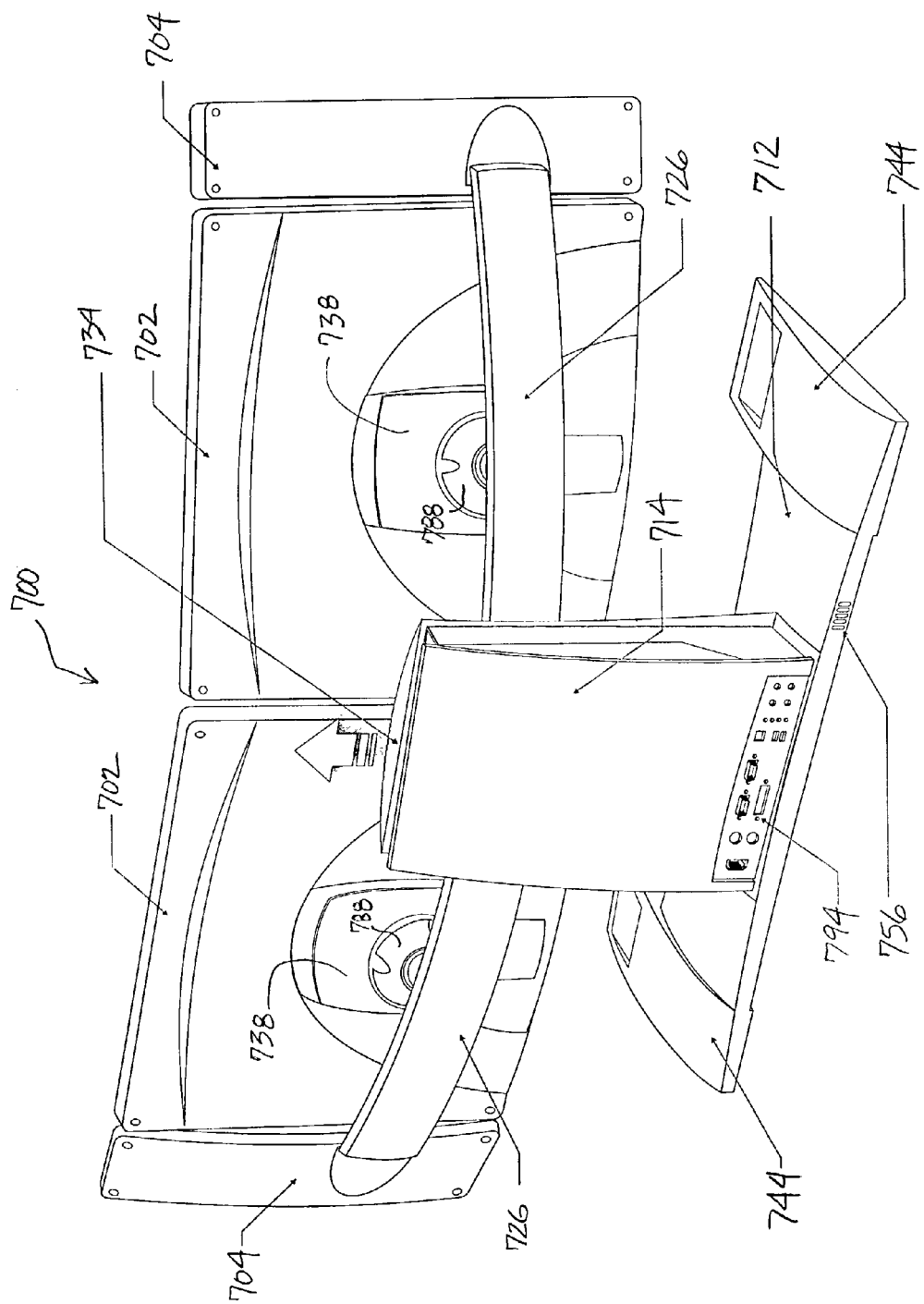
FIG. 18 is rear perspective view of the computer system according to an eighth embodiment.

Referencing FIG. 18 an LCD support system 700 according to an eighth embodiment is shown wherein like reference numbers increased by 700 over those used in conjunction with system 10 will be used to designate like components. Support system 700 includes integral base 712 and column 714. As such, column 714 houses the main motherboard, CPU, hard drive and floppy drive. A sound card is also preferably integrated on the motherboard. Base 712 houses the main power supply and peripheral devices 744 which may include DVD, CD-ROM or ZIP drives for example. Peripherals 744 are built into base 712.

Arm 726 is laterally mounted using the aforementioned slider bracket configuration. Arm 726 accepts multiple displays 702 by way of pivot brackets 738. The necessary wiring to run power and signals from the graphics card to the displays 702 is channeled through arm 726. Speakers 704 are coupled at opposite ends of arm 726. Likewise, the necessary wiring for speakers 704 is routed through arm 726.

Column 714, which operably houses the motherboard and CPU, includes vent ports 734 integrated thereon. Connection panel 794 includes parallel and serial ports, USB, NIC, audio interface ports, AC and PS2 connectors. A multi-output graphics adapter is preferably integrated on the motherboard (within column 714) or may also be mounted as a separate card within arm 726. A power supply vent 756 is incorporated on base 712.

Figure 19:
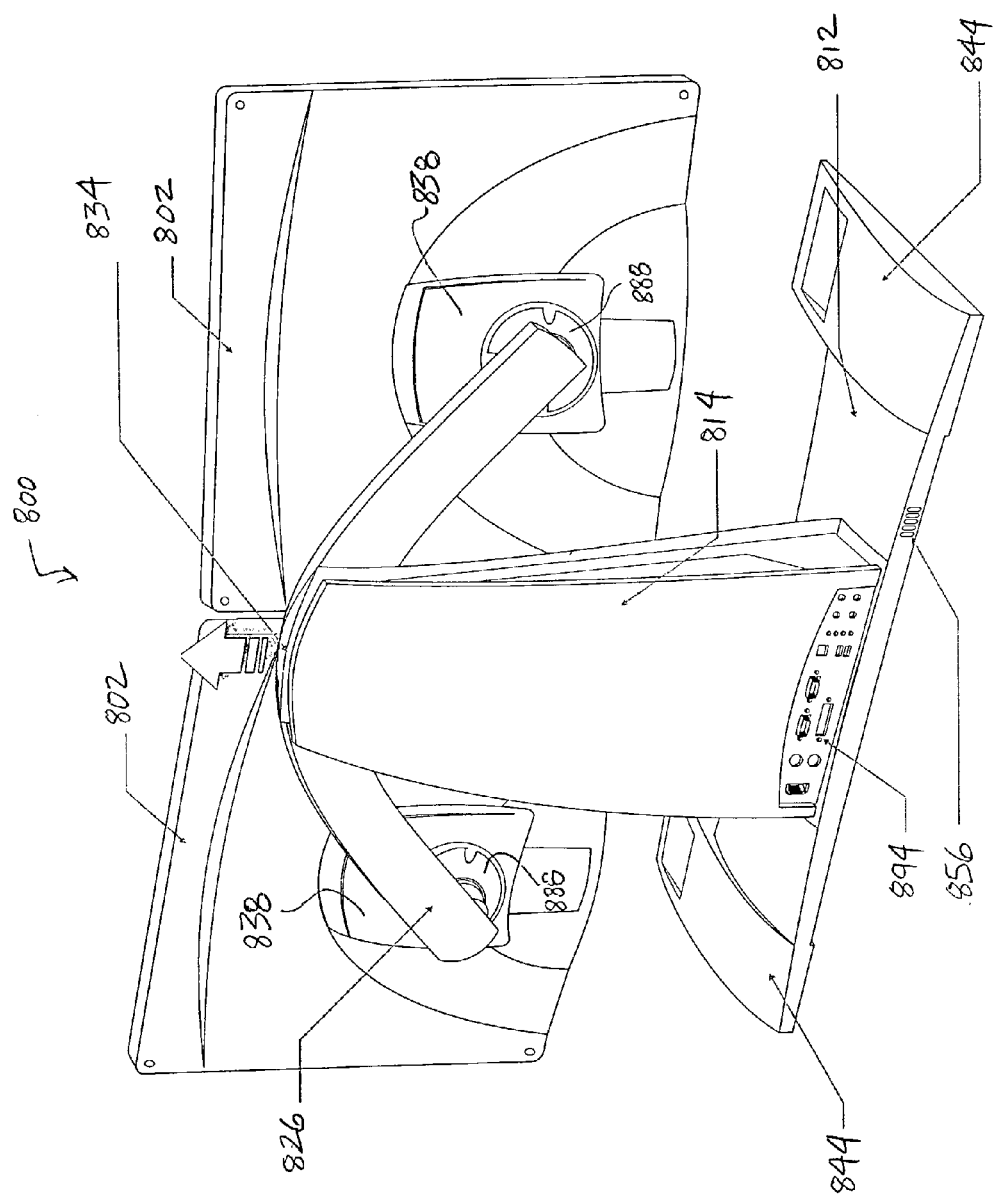
FIG. 19 is a rear perspective view of the computer system according to a ninth embodiment.

FIG. 19 illustrates an LCD support system 800 according to a ninth embodiment wherein like components in common with system 700 are designated by reference numbers increased by 100 over those used in connection with system 700. As with eighth embodiment 700, the base 812 and column 814 are an integral unit. LCD support structure 800 includes arm 826 having an arched contour. All necessary wiring for displays 802 is channeled through arm 826. Column 814 is tapered toward an upper edge and extends a sufficient amount to accommodate the vertical displacement of arm 826.

Figure 20:
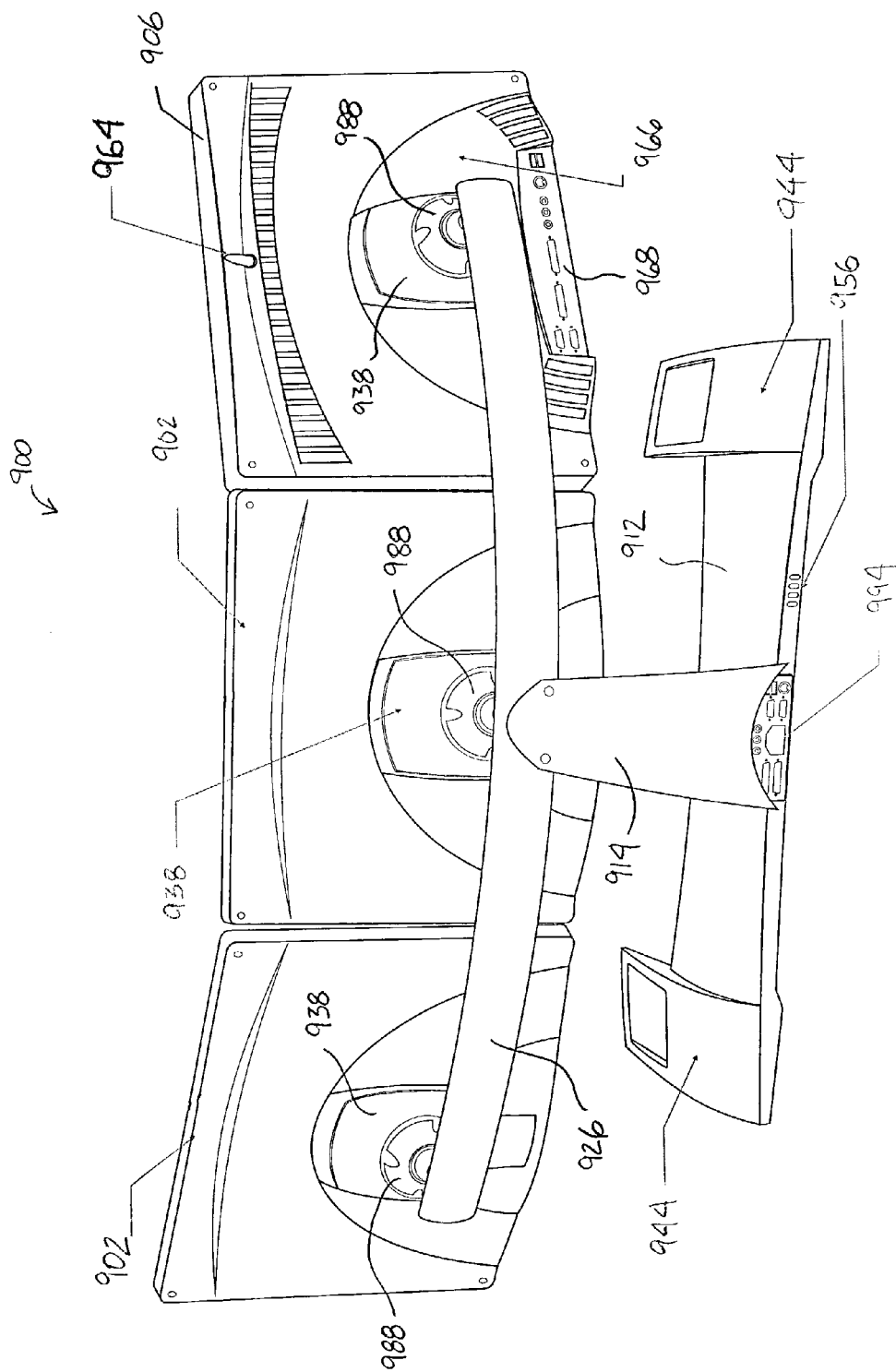
FIG. 20 is a rear perspective view of the computer system according to a tenth embodiment.

FIG. 20 illustrates an LCD support system 900 according to a ninth embodiment wherein like components in common with system 800 are designated by reference numbers increased by 100 over those used in connection with system 800. Support system 900 includes integral base 912 and column 914. Three displays are horizontally arranged across arm 926. Display 906 incorporating transmitter 964 is arranged together with two displays 902. Transmitter 964 is integrated with CPU module 966 and provides wireless networking capability to system 900. Interface panel 968 includes parallel and serial ports, USB, NIC, audio, AC and PS2 connections. Arm 926 includes an internal passage for housing all necessary cables and wires.

Figure 21:
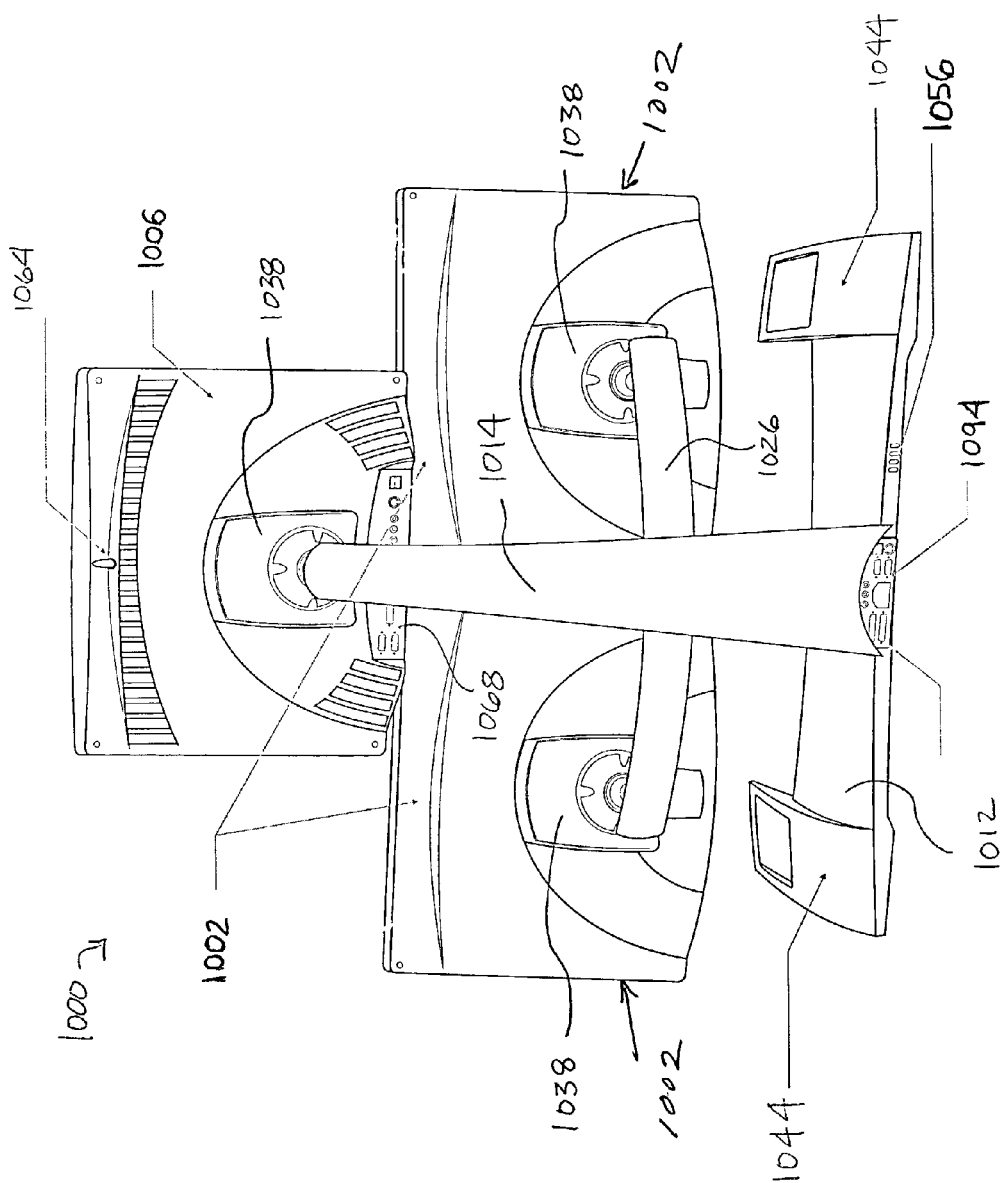
FIG. 21 is a rear perspective view of the computer system according to an eleventh embodiment.

FIG. 21 illustrates an LCD support system 1000 according to a tenth embodiment wherein like components in common with system 900 are designated by reference numbers increased by 100 over those used in connection with system 900. Three LCD displays are arranged in a triangular relationship. Display 1006 has a transmitter 1064 coupled to column 1014 by way of pivot bracket 1038 and is disposed above adjacent displays 1002.

Figure 22:
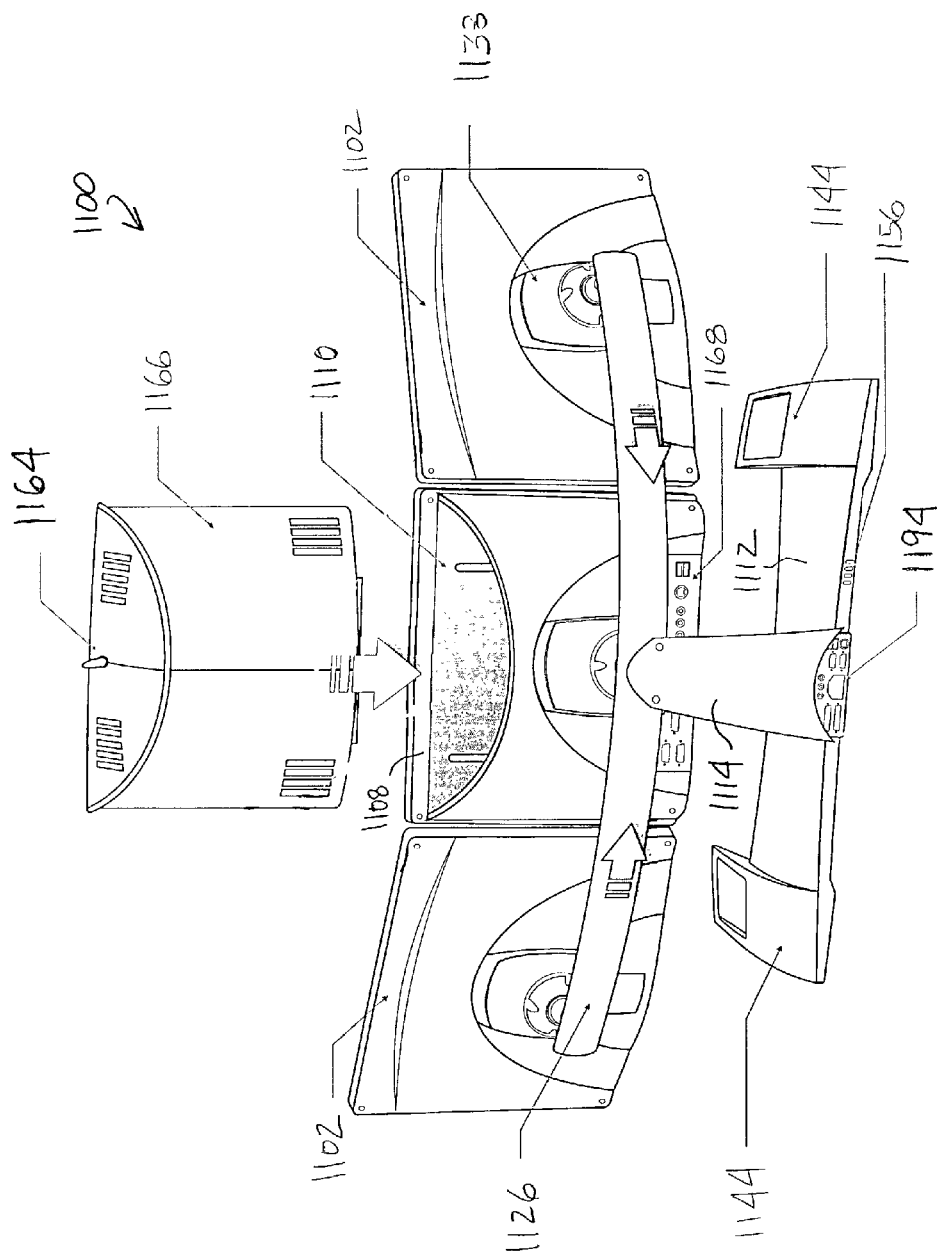
FIG. 22 is a rear perspective view of the computer system according to a twelfth embodiment having a selectively removable CPU module.

Turning now to FIG. 22 an LCD support system 1100 including removable CPU 1166 is shown. Like components in common with system 1000 are designated by reference numbers increased by 100 over those used in connection with system 1000. Display 1108 includes cradle 1110 for selectively receiving CPU 1166. In this way, CPU 1166 may be transferred from one support system to another. It should be noted that the central placement of display 1108 is merely exemplary and display 1108 may alternatively be placed on either end of arm 1126. In addition, it will be appreciated that display 1108 incorporating removable CPU 1166 may be used in conjunction with any support system described herein.

Figure 23:
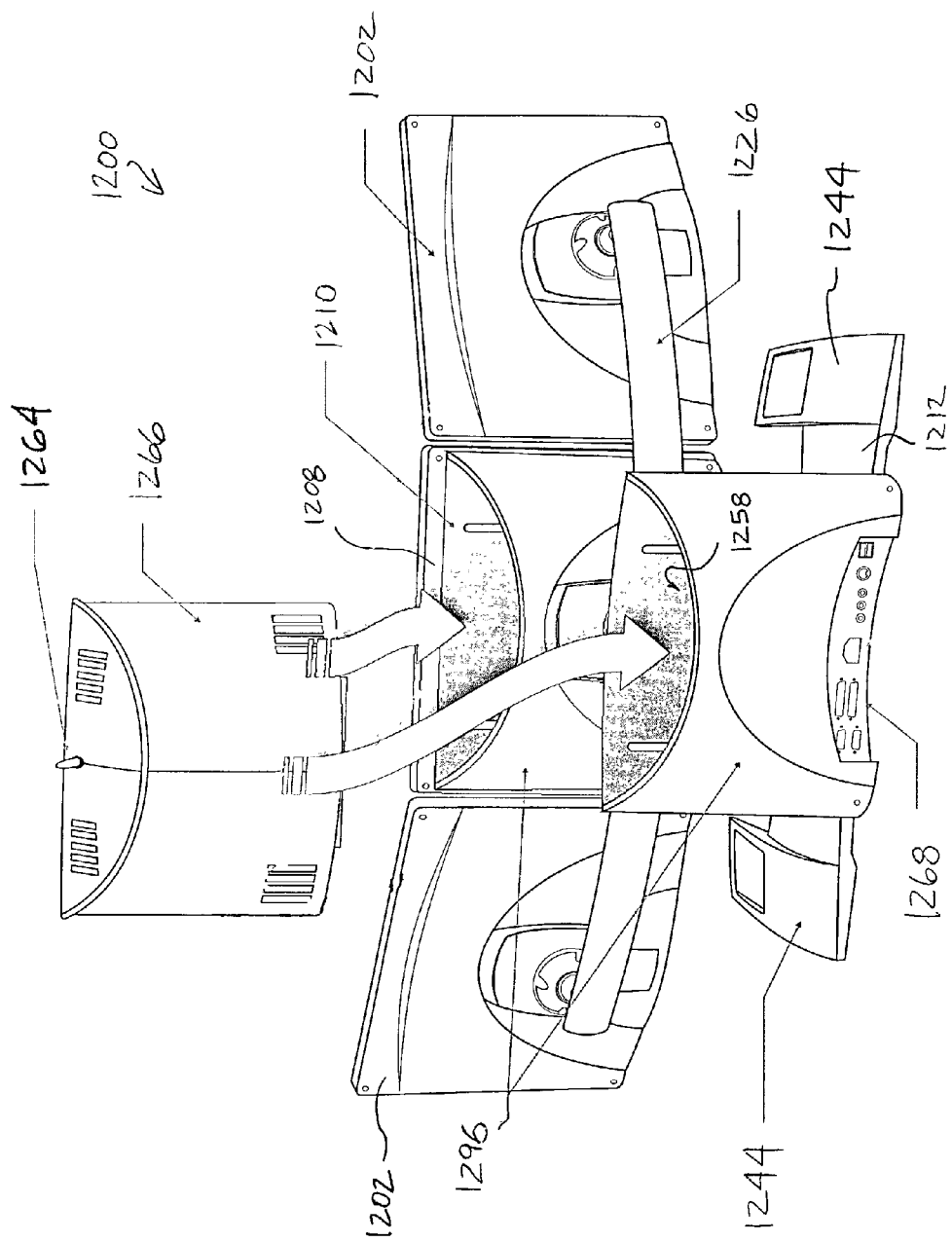
FIG. 23 is a rear perspective view of the computer system according to a thirteenth embodiment having a primary and secondary docking cradle.

FIG. 23 shows LCD support system 1200. Like components in common with system 1100 are designated by reference numbers increased by 100 over those used in connection with system 1100. Support system 1200 includes a multiport docking system 1296. Docking system 1296 includes a cradle 1210 integrated with display 1208 as well as a secondary cradle 1258. Secondary cradle 1258 is coupled to base 1212. Interface panel 1268 includes parallel and serial ports, USB, NIC, audio interface ports, AC and PS2 connectors.

It will be appreciated that all of the preferred embodiments described herein completely eliminate or substantially reduce the need for any external electrical cabling for coupling various subcomponents making up the various LCD support systems, as well as the need for external power supplies. The preferred embodiments thus all serve to provide a very uncluttered LCD support system which has built in to it all the connectors necessary to effect coupling of the various subcomponents to one another. Also, while reference has been made throughout to LCD screens, it will be appreciated that the support system disclosed herein is equally well suited to be used with virtually any type of flat panel-type display screen, or other form of display screen.

While the invention has been described in the specification and illustrated in the drawings with reference to various preferred embodiments, it will be understood by those skilled in the art that various changes may be made and equivalents may be substituted for elements thereof without departing from the scope of the invention as defined in the claims. For example, the integral base and column may be incorporated with any of the computer systems disclosed herein. Therefore, it is intended that the invention not be limited to the particular embodiments illustrated by the drawings and described in the specification as the best mode presently contemplated for carrying out the invention, but that the invention will include any embodiments falling within the present description and the appended claims.

What is claimed is:

1. A computer having a central processing unit and a display support structure for selectively arranging a plurality of viewing screens, said computer comprising:

a support base having a central processing unit interface portion for selectively interconnecting the plurality of viewing screens with the central processing unit;

a column upwardly extending from the base;

an arm comprising an engagement portion for selectively coupling to a complimentary engagement portion disposed on the column; and at least one bracket coupled to the arm and operable to be slidably moved along the arm, the at least one bracket being operable to couple with a respective one of the plurality of viewing screens.

2. The computer of claim 1, wherein the support base comprises laterally extending foot portions on opposite sides thereof.

3. The computer of claim 2, wherein the foot portions are selectively removable from the support base.

4. The computer of claim 2, wherein at least one of the foot portions comprises a peripheral device.

5. A computer having a display support structure, the display support structure having a central processing unit and supporting a plurality of viewing screens, wherein the display support structure comprises:

a support base for connecting the plurality of viewing screens with the central processing unit;

a column upwardly extending from the base; and an arm mounted to the column for supporting at least two of the plurality of viewing screens.

6. The computer of claim 5, wherein the arm comprises a sliding bracket arrangement for slidably moving the at least two viewing screens along the arm.

7. The computer of claim 5, wherein the arm houses power and signal wiring to the at least two viewing screens.

8. The computer of claim 5, wherein the arm is adapted to support speakers at opposite ends thereof.

9. The computer of claim 5, wherein the arm has an arched contour.

10. The computer of claim 5, wherein one of the viewing screens has operably associated therewith a wireless network connection.

11. A computer having a display support structure for selectively arranging a plurality of viewing screens, said computer comprising:

a pedestal configured to house a processing unit having a circuit board, a central processing unit and a memory, the processing unit and memory being connected to the circuit board, the pedestal comprising an aim extending from the pedestal and a bracket configured to couple with and support the display screen, the bracket being slidably positionable on the arm at a location sufficient to accommodate the display screen;

a foot connected to the pedestal, the foot being configured to provide additional support to the pedestal and to house a peripheral device, the peripheral device comprising at least one of a communication device, a media player and a storage device; and, a connector for connecting the pedestal to the foot and permitting communication between the peripheral device and the processing unit, the connector comprising mechanical securing means for securing the foot to the pedestal and further comprising electronic connecting means for permitting electronic communication between the peripheral device and the processing unit.

* * * * *